US007000122B2

(12) United States Patent
Zafarana et al.

(10) Patent No.: US 7,000,122 B2
(45) Date of Patent: Feb. 14, 2006

(54) MANAGING SYSTEM AND SYNCHRONIZATION METHOD FOR A PLURALITY OF VRM-TYPE MODULES

(75) Inventors: Alessandro Zafarana, Milan (IT); Claudia Castelli, Brugherio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 741 days.

(21) Appl. No.: 09/982,132

(22) Filed: Oct. 16, 2001

(65) Prior Publication Data
US 2002/0073347 A1    Jun. 13, 2002

(30) Foreign Application Priority Data
Oct. 16, 2000    (IT)    .......................... MI2000A2233

(51) Int. Cl.
*G06F 1/26*    (2006.01)
(52) U.S. Cl. .......................... 713/300; 307/44; 307/53; 323/272; 323/316; 363/21.01; 363/65
(58) Field of Classification Search ................. 307/44, 307/53; 323/272, 316; 363/21.01, 65; 713/300
See application file for complete search history.

(56) References Cited
U.S. PATENT DOCUMENTS 4,609,828 A  *  9/1986  Small ........................... 307/44
4,717,833 A  *  1/1988  Small ........................... 307/44
5,834,925 A  *  11/1998 Chesavage ................... 323/272
6,181,120 B1 * 1/2001 Hawkes et al. ............. 323/282

OTHER PUBLICATIONS

Mike Walters, "Current Sharing Technique for VRMs", Intersil Technical Brief 385, Jul. 2002.*
Intersil Press Release, "Intersil Develops New Current Sharing Technology fo Next Generation Computer Microprocessors", May 9, 2000.*
Bob Mammano, "Load Sharing with Paralleled Power Supplies", Unitrode Power Supply Design Seminar, Sep. 1991.*

* cited by examiner

*Primary Examiner*—Thomas Lee
*Assistant Examiner*—Albert Wang
(74) *Attorney, Agent, or Firm*—Lisa K. Jorgenson; Robert Iannucci; Seed IP Law Group PLLC (57) ABSTRACT

A managing system manages a plurality of VRMs associated with a plurality of microprocessors and connected in parallel together between first and second voltage references, the VRMs having output terminals connected together and arranged to communicate over a common bus. The managing system includes an error amplifier being input an output voltage signal from the VRM plurality, a reference voltage, and a droop voltage produced through an equivalent droop resistor receiving an output current signal from the VRM plurality and being connected to the common bus. The error amplifier effects a comparison of the input signals to generate a control voltage signal to the VRM plurality. Advantageously, the managing system comprises a controller connected to the equivalent droop resistor.

12 Claims, 6 Drawing Sheets

MANAGING SYSTEM AND SYNCHRONIZATION METHOD FOR A PLURALITY OF VRM-TYPE MODULES

BACKGROUND OF THE INVENTION

1. Field of the Invention

The present invention relates to a managing system and synchronization method for a plurality of voltage regulator module VRM-type modules.

Specifically, the invention relates to a managing system for managing a plurality of VRMs, which are associated with a plurality of microprocessors and connected in parallel together between first and second voltage references, said VRMs having output terminals connected together and arranged to communicate over a common bus, wherein said managing system comprises at least one error amplifier being input an output voltage signal from said plurality of VRMs, a reference voltage, and a droop voltage produced through an equivalent droop resistor receiving an output current signal from said plurality of VRMs and being connected to said common bus, said error amplifier effecting a comparison of said input signals to generate a control voltage signal to said plurality of VRMs.

The invention further relates to a method of synchronizing a plurality of VRMs associated with a plurality of microprocessors and connected in parallel together between first and second voltage references, said VRMs having output terminals connected to a common bus line, and relates to a synchronization circuit implementing the method.

2. Description of the Related Art

As is well known, supply sharing architectures offer a number of advantages in microprocessor-based systems. Such systems must be equipped with load current regulators, e.g., of the so-called point-of-load type, to provide high levels of accuracy as well as the dynamic load needed by the microprocessors.

However, VRMs (Voltage Regulator Modules) are used in place of the point-of-load regulators in up-to-date microprocessor architectures. VRMs afford effective voltage handling, and come with standard form factors to tailored specifications for different end user's requirements.

In particular, multiprocessor systems for such computers as Servers and Workstations employ a plurality of microprocessors to meet the requirements of these substrata. For internal voltage handling, the systems include one VRM for each microprocessor. In this way, the whole system is ensured adequate modularity and scale economy.

Multi-processor systems conventionally comprise a plurality of microprocessors, all connected to the same supply voltage and ground references, VDD and GND, respectively. It is sound practice to have all the microprocessors powered over a common supply-to-ground path, for improved speed and integrity of the interconnect signals between them.

In addition, VRMs usually have output terminals on a common plane. Thus, a managing method is demanded to equalize the load among them, especially to apportion them the load current equally for proper operation of the parallel connection.

It should be considered, in this respect, that processing units (CPU) comprising such microprocessors draw different current levels according to their working conditions. Thus, by controlling the current distribution through equalized VRM load levels, a higher degree of reliability from reduced terminating peaks of the individual VRMs and improved response to load transients can be achieved.

For such multi-processor systems to operate properly, it should be possible to have the VRMs inter-related operatively under all working conditions, such as at initial turn-on (start-up, soft-start), operation of module-protecting mechanisms (e.g., in overload OCP or overvoltage OVP situations), and re-initializing and short-circuiting of the cascaded module output plane (HICCUP).

Known are two different basic techniques for paralleling a plurality of VRMs, namely the master-slave and the average current sharing methods.

In particular, a conventional current managing system for VRMs as above, using a current sharing technique, is described in an article "Current Sharing Technique for VRMs" by M. Walters, Intersil Corp., May 2000, and shown schematically in FIG. 1.

Figure 1:
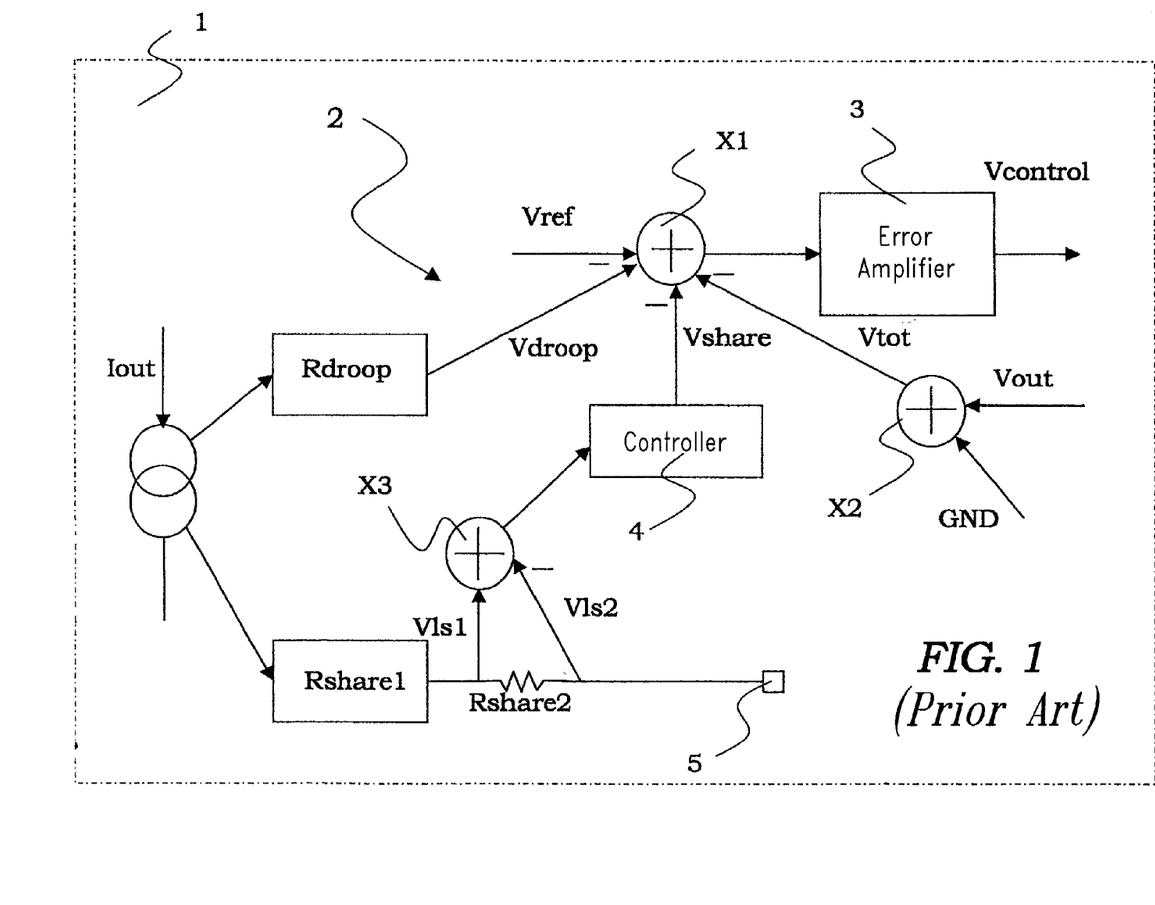
FIG. 1 shows schematically a VRM managing system according to the prior art.

According to that article, each VRM 1 includes a managing system 2, itself including an error amplifier 3.

The error amplifier 3 is input an output voltage signal Vout from the VRM 1 and a reference voltage Vref, and will compare them to generate a control voltage signal control to VRM 1.

In particular, the error amplifier 3 has its input connected to a first summing node X1 that receives the reference voltage Vref as a positive addend, and receives a droop voltage Vdroop, a control voltage Vshare, and a total voltage Vtot resulting from the summation, performed in a second summing node X2, of the output voltage signal Vout from the VRM 1, and a supply voltage reference such as a ground voltage GND.

The managing system 2 includes an equivalent droop resistor Rdroop receiving an output current signal Iout from the VRM 1 and being connected to supply the droop voltage Vdroop to the first summing node X1.

In addition, the output current signal Iout from the VRM 1 is passed into a first control resistor Rshare1 arranged to supply a first local control or share voltage Vls1 to a third summing node X3, which is connected to a controller 4 adapted to supply the control voltage Vshare to the first summing node X1.

The third summing node X3 is input, as a negative addend, a second local control voltage Vls2 from a second control resistor Rshare2 connected, in series with said first control resistor Rshare1, to a current sharing bus 5.

Let us see now how the conventional managing system 2 shown in FIG. 1 operates.

The information in the output current Iout from the VRM 1 is used to shift the reference for the control loop proportionally to the load (the so-called voltage positioning) through the equivalent droop resistor Rdroop. Also, the output current Iout is converted into voltages Vls1, Vls2 by means of the control resistors Rshare 1, Rshare2, and is used in the current sharing loop of the managing system 2 that includes the controller 4 and the error amplifier 3.

Within each module 1, the first local control voltage Vls1 is taken to the common bus 5 through the second control resistor Rshare2. Thus, the voltage on this bus is made proportional to the average current of all modules 1, and the voltage difference Vls2 across the second control resistor Rshare2 proportional to the difference between the current of the individual modules 1 and said average current.

This information about the individual modules 1 with respect to the mean of all modules is passed to the controller 4, and through the first summing node X1, onward to the error amplifier 3, whose output error signal is used, following appropriate amplification and filtering in a conventional manner, to shift the feedback of the error amplifier 3 and generate the control voltage signal Vcontrol.

Therefore, the regulated output voltage signal Vout from each module 1 will be:

Vout=Vref−Vdroop−Vshare.

It should be further noted that the droop voltage Vdroop is proportional to the output current signal Iout, and the control voltage Vshare is proportional to the ratio Iload/N-Iout, where N is the number of VRMs 1 in parallel within the microprocessor system, and Iload is the load current.

In conclusion, the control voltage V share allows unbalance among the various VRMs 1 to be adjusted in order that their output currents are equalized.

While advantageous on several counts, this prior solution has a number of drawbacks. Specifically, the sums of the internal VRM signals must be performed by voltage and require the availability of amplifiers, which deteriorates the dynamic response and precision of the VRMs 1 as well as of the microprocessor system as a whole.

Using additional resistors to perform the sums in a passive manner would lower the individual contributions, so that pre-amplification becomes necessary and the construction of the managing system 2 becomes more complicated.

Multi-processor systems having a plurality of VRMs also pose the problem of how to synchronize the individual VRMs in parallel, which problem grows in importance with the number of modules.

BRIEF SUMMARY OF THE INVENTION

An embodiment of this invention provides a system for managing a plurality of VRMs associated with a multi-processor system, which system has appropriate structural and functional features to overcome the limitations and drawbacks of the prior art.

The system uses an internal control voltage to modify the droop voltage, and with it the control voltage signal of each VRM.

The features and advantages of the system and the method according to the invention will appear from the following description of embodiments thereof, given by way of non-limitative examples with reference to the accompanying drawings.

DETAILED DESCRIPTION OF THE INVENTION

Figure 2:
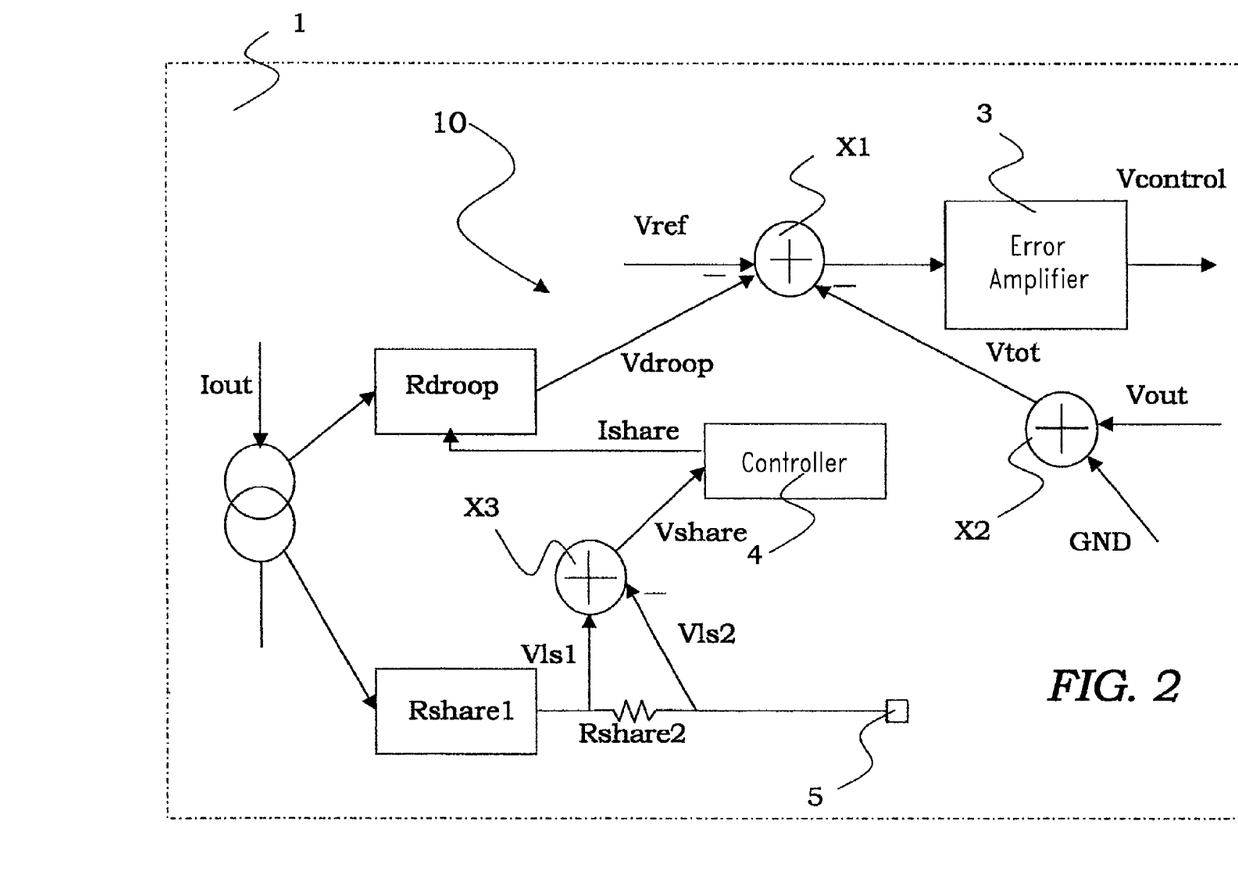
FIG. 2 shows schematically a VRM managing system according to the invention.

With reference in particular to FIG. 2 of the drawings, a system for managing a plurality of VRMs, according to this invention, is generally shown at 10 in schematic form.

The same reference numerals are used, for clarity reasons, to denote structurally and functionally identical elements with those of the state-of-art managing system shown in FIG. 1.

The managing system 10 for managing a plurality of VRMs 1 includes an error amplifier 3, which is input an output voltage signal Vout from each VRM 1 and a reference voltage Vref.

The error amplifier 3 effects a comparison of the signals input thereto and generates a control voltage signal Vcontrol to the VRM 1.

In particular, the error amplifier 3 has its input connected to a first summing node X1, which node receives the reference voltage Vref as a positive addend, and receives a total voltage Vtot resulting from the summation performed in a second summing node X2 of the output voltage signal Vout from VRM 1 and a supply voltage reference such as a ground GND, and a droop voltage Vdroop as negative addends.

The managing system 10 further includes an equivalent droop resistor Rdroop, which receives an output current signal Iout from VRM 1 and is connected to supply the droop voltage Vdroop to the first summing node X1.

The output current signal Iout from VRM 1 is also sent to a first control resistor Rshare1, which is arranged to supply a first local control or share voltage Vls1 to a third summing node X3, itself connected to a controller 4.

The third summing node X3 is input, as a negative addend, a second local control voltage Vls2 derived from a second control resistor Rshare2, the latter being connected, in series with said first control resistor Rshare1, to a common or current-sharing bus 5.

Advantageously, the controller 4 is input the control voltage Vshare, and outputs an internal control current Ishare directly to the equivalent droop resistor Rdroop.

Figure 3:
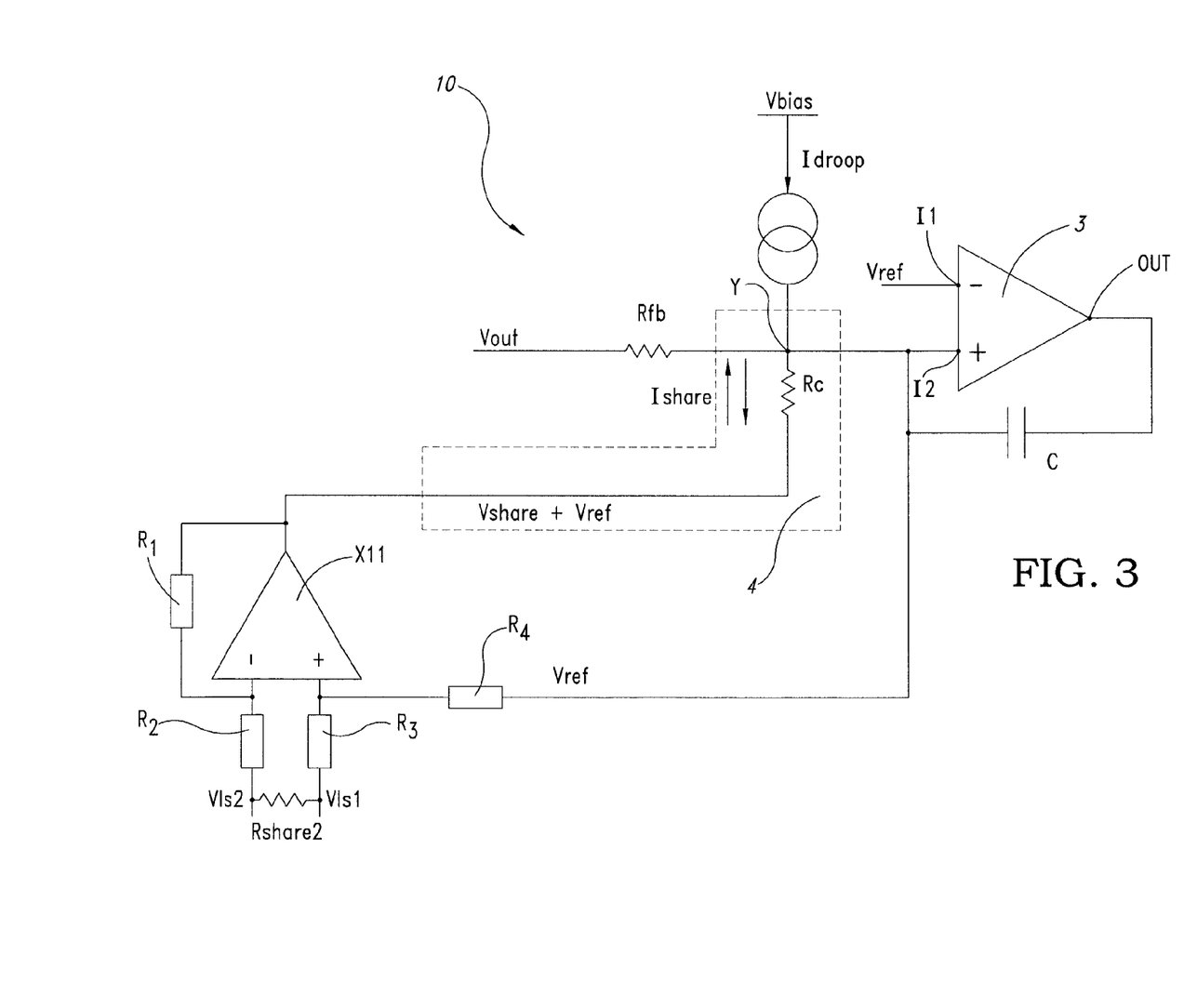
FIG. 3 shows schematically an embodiment of the system of FIG. 2.

Shown in FIG. 3 is an embodiment of the managing system 10, which is given by way of non-limitative example, the possibility of introducing design alterations and component substitutions being apparent to the skilled ones in the art.

The managing system 10 includes an error amplifier 3 having a first input terminal I1 to receive the reference voltage Vref and an output terminal OUT, the latter being feedback-connected to a second input terminal I2 through a capacitor C.

The second input terminal I2 is also connected to an internal circuit node Y, which receives both a droop current Idroop, i.e., a proportional current to the load of VRM 1 and hence to the output current Iout, and an internal control current Ishare, the sum of these currents (Idroop+Ishare) being passed through a feedback resistor Rfb.

Advantageously, the internal circuit node Y is also connected to the compensating sub-system 4, which includes a compensation resistor Rc to receive the sum of the control voltage Vshare and the reference voltage Vref. The sum of the control voltage Vshare and the reference voltage Vref is produced by an error amplifier 11 with a first resistor $R_1$ feedback-connected between an output and an inverting input of the error amplifier 11. A second resistor $R_2$ is connected between the inverting input and the second local control voltage Vls2, a third resistor $R_3$ is connected between a non-inverting input of the error amplifier 11 and the first local control voltage Vls1, and a fourth resistor $R_4$ is connected between the non-inverting input and the second input terminal I2 of the error amplifier 3. It will be appreciated that, under static conditions, the input terminals I1, I2 of the error amplifier 3 are at the same voltage Vref, and thus, the non-inverting terminal of the amplifier 11 could be connected to either of the input terminals I1, I2. The resistors $R_1$–$R_4$ may have the same resistance value which is chosen to be high in one embodiment so that the connection between the non-inverting terminal of the amplifier 11 and the second input terminal of the amplifier 3 does not affect the signal currents Idroop and Ishare.

In this case, the regulated output voltage signal Vout from each VRM 1 is given as:

Vout=Vref−Idroop*Rfb−Vshare*Rfb/Rc, where:

Rdroop=*Idroop=Rfb/Iout and Ishare=Vshare/Rc are always true.

In other words, the equivalent droop resistance Rdroop is equal to the feedback resistance Rfb multiplied by the read current factor of the VRM (Idroop/Iout).

It should be noted that the value of the droop current Idroop is proportional to the value of the output current signal Iout from VRM 1, while the control voltage Vshare is proportional to the ratio Iload/N-Iout, where N is the number of cascaded VRMs 1.

Let us see now the operation of the managing system 10 for managing a plurality of cascaded VRMs.

Unlike prior solutions, the control voltage Vshare, i.e., the error signal from the control or current sharing loop acts to modify the droop current Idroop, as shown clearly in FIG. 3.

Thus, the managing system 10 has an advantage in that it performs sums on current signals rather than voltage signals as in prior systems. In this way, the need for amplifiers, which would debase the dynamic range and accuracy of the whole system, is removed, and no additional resistors are required in order to provide a passive type of summing, which would make the system more complicated.

However, for the cascaded VRMs 1 to operate properly in a multi-processor system, the modules must be suitably synchronized.

Advantageously, a method of synchronizing a plurality of VRMs in a multi-processor system, which method makes use of the voltage level on the current sharing bus 5, and a synchronization circuit carrying out the method will now be described.

Figure 4:
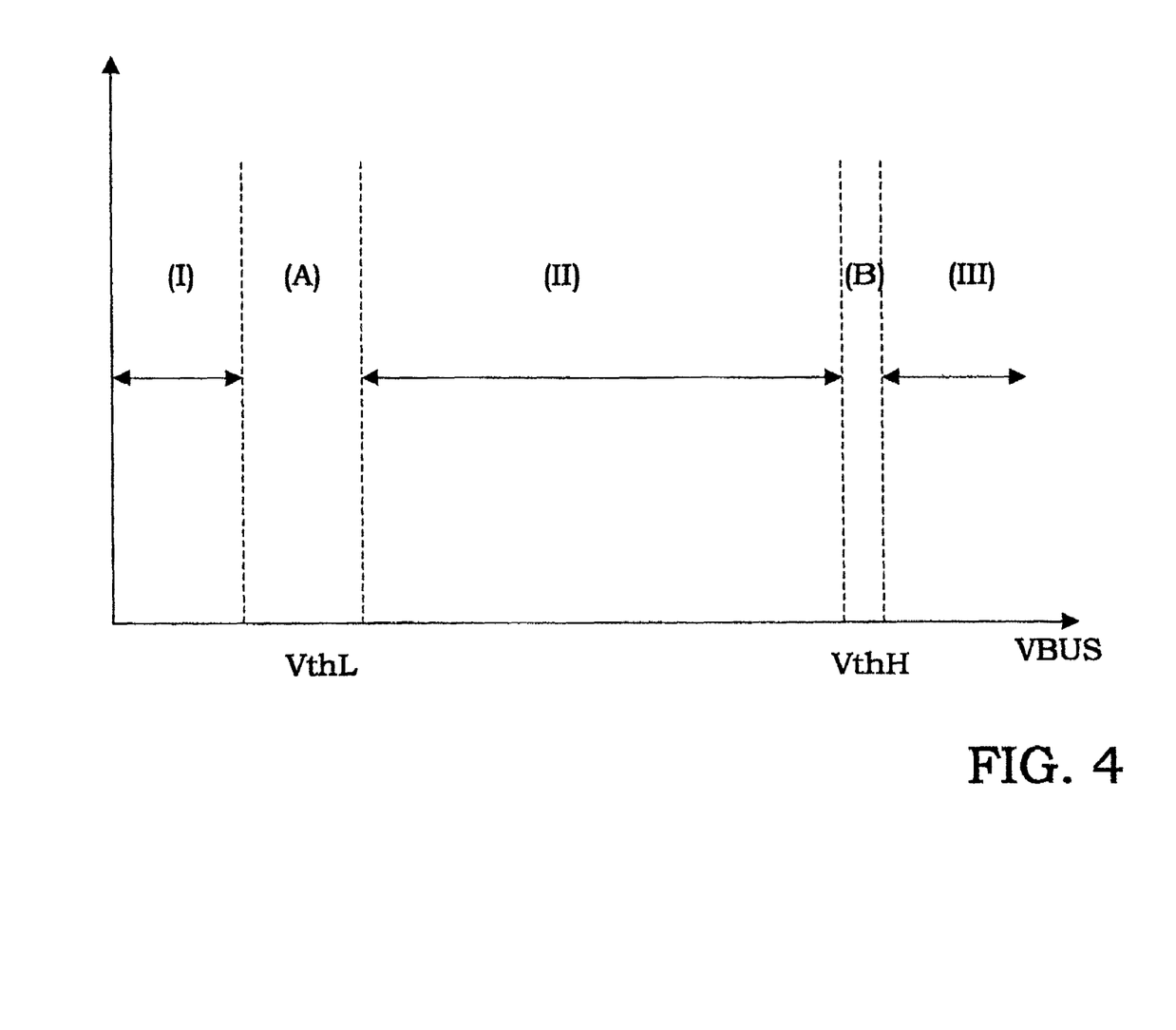
FIG. 4 illustrates schematically a VRM synchronizing method of the invention.

In particular, the range of a voltage VBUS provided to the common bus 5 is divided into discrete sub-ranges, each corresponding to a different working condition of the multi-processor system, as shown schematically in FIG. 4.

Figure 5:
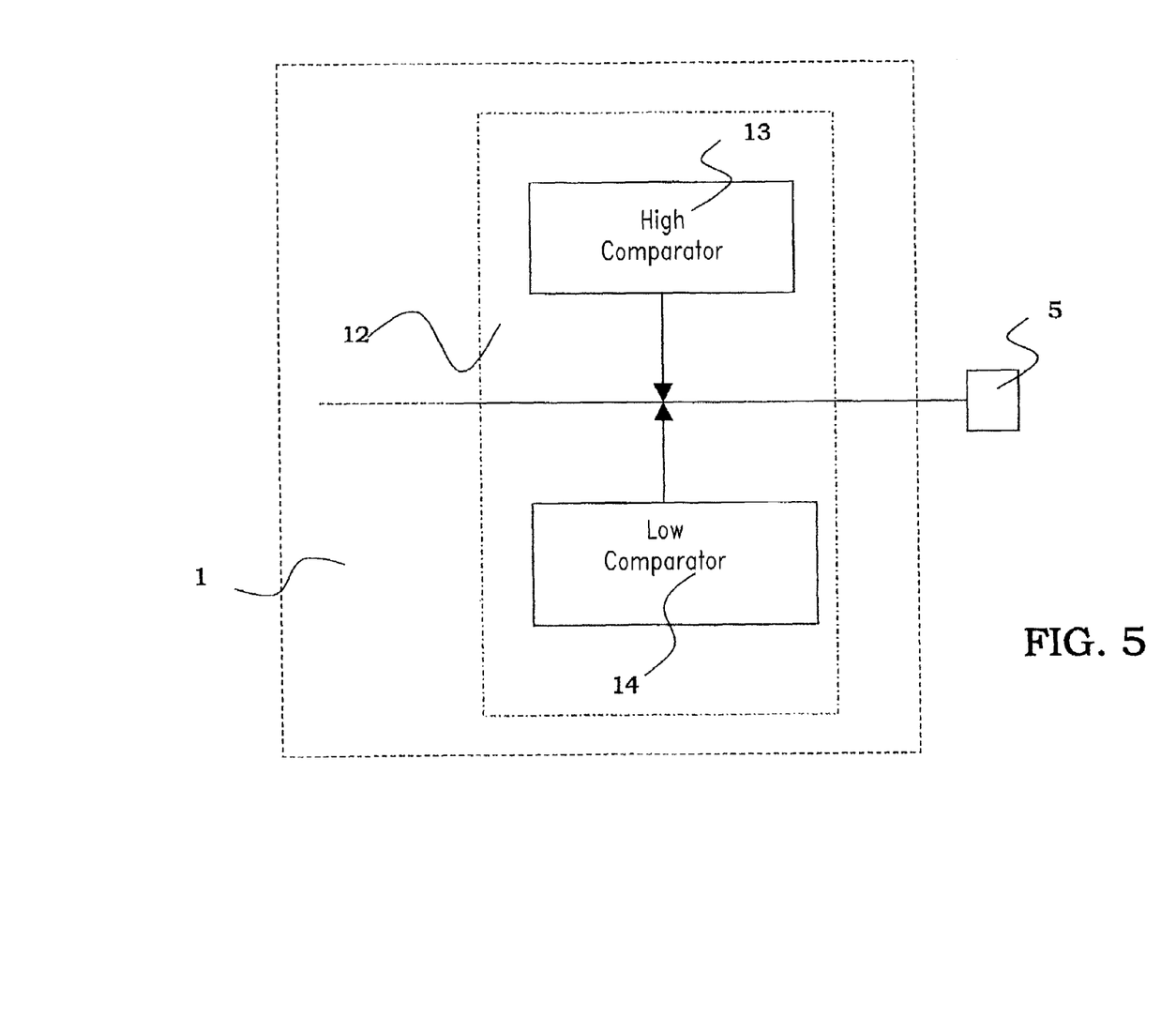
FIG. 5 shows schematically an embodiment of a synchronization circuit using the method of FIG. 4.

FIG. 5 shows schematically an embodiment of a synchronization circuit 12 according to the invention, the circuit being connected to the current sharing bus 5 to monitor the voltage thereon.

The synchronization circuit 12 comprises basically a "high" comparator 13 and a "low" comparator 14 having a high tripping threshold VthH and a low tripping threshold VthL, respectively, and is integrated to each VRM 1.

In particular, the voltage range on the common bus 5 is divided into a first sub-range (I) of values lying below the low tripping threshold VthL, a second sub-range (II) of values lying between the low tripping threshold VthL and the high tripping threshold VthH, and a third sub-range (III) of values lying above the high tripping threshold VthH, i.e.:

(I) VBUS<VthL
(II) VthL<VBUS<VthH
(III) VBUS>VthH.

Notice that first (A) and second (B) transition ranges are also provided to accommodate suitable tolerances in those values of the bus voltage VBUS.

As explained in detail hereinafter, these sub-ranges correspond to different working conditions of the VRMs 1, namely:

(I) situations of overload OCP, or short-circuit HICCUP, or overvoltage OVP;
(II) normal operation;
(III) start-up phase.

Let us review now the synchronizing method under the various working conditions.

1. In the initial or start-up situation, the cascaded VRMs 1 may enter the soft-start procedure at different times due to delays in the rising times of the respective supply references, and to internal mismatching.

With no synchronization of the voltage rising ramps on the common bus 5 at start-up, one module could enter the turn-on phase ahead of the others, resulting in the appearance of a large loop-back current in the late modules.

Advantageously, a line CSBUS in the common bus 5 is pulled high, i.e., the voltage VBUS is pulled above the high tripping threshold VthH of the "high" comparator 13, by synchronizing the start-up phases of the plural VRMs 1, as follows:

each VRM 1, before entering the soft-start phase, pulls the internal line high that corresponds to the first local control or share voltage Vls1, i.e., pulls it to a voltage above the high tripping threshold VthH;

since the voltage VBUS on the common bus 5 is the mean of the local control voltages Vls1, the line CSBUS will go high (VBUS>VthH) only when all the cascaded VRMs 1 are ready to enter the soft-start phase, this occurrence being indicated by the comparator 13;

at this stage, and based upon the indication provided by the comparator 13, all the VRMs will enter the soft-start phase simultaneously, at the same time as they release the line of the local control voltage Vls1, thereby enabling the current-sharing loop to find a value for the control voltage Vshare, as shown in FIG. 2, in the normal operating range (II).

The start-up phase corresponds, therefore, to the third sub-range (III) of the bus voltage VBUS. During this phase, the "high" comparator 13 will be 'on'.

2. During the overload phase OCP, that VRM 1 which has detected a current overload is to transmit this information to the other VRMs 1 connected in parallel to the common bus 5, so as to prevent them from also entering a condition of overload OCP, or short-circuit HICCUP, or coming to grief.

Advantageously, a VRM will transmit the overload OCP or short-circuit HICCUP condition to the other cascaded modules by forcing the line CSBUS down, i.e., by pulling the bus voltage VBUS below the low tripping threshold VthL. In particular, the bus voltage VBUS is pulled to ground GND.

For the purpose, all the VRMs 1 would, upon an indication from the comparator 14 of the occurrence of a condition of overload OCP or short-circuit HICCUP, activate ordinary protection techniques.

3. When the overload condition OCP or the short-circuit condition HICCUP is followed by a re-initialization procedure, i.e., an attempt to re-start the system by a soft-start procedure, the synchronization of the various VRMs 1 will take place according to the same procedure as for the initial or start-up situation.

Advantageously, the re-initialization procedure would start upon a VRM 1 under an overload condition OCP or a short-circuit condition HICCUP releasing the line CSBUS to allow it to revert to the normal voltage range, i.e., the range between the low tripping threshold VthL and the high tripping threshold VthH.

Upon the "low" comparators 14 being operated, the VRMs 1 are re-started using the soft-start procedure and synchronized same as for the start-up procedure.

It is optionally possible to set a number a re-initialization and start-up attempts after which any subsequent attempts would be fruitless and a faulty condition (FAULT) would be indicated as explained here below.

4. On entering an overvoltage condition OVP, or after a number of attempts at re-initializing following a short-circuit situation HICCUP, the VRM stop operating.

A VRM would stay in the entered condition until the supply references of the host multi-processor system are pulled down and then up again (FAULT).

With several VRMs working in parallel, as one of them detects an overvoltage OVP, it creates a path in parallel with the CPU load by holding in the 'on' state its low-side transistor. Thus, the current in the other VRMs is bound to increase and create an uncontrolled current that will flow through said low-side transistor, held permanently 'on', in an attempt to protect the CPU.

Advantageously, the indication of a faulty condition FAULT is given through the line CSBUS being pulled by the overvoltage module to the same level as that used above for indicating the overload condition OCP or short-circuit condition HICCUP, i.e., to ground GND.

In this case, however, the line CSBUS would only be released after the supply references are pulled down and then up again (FAULT), i.e., no subsequent automatic re-initializing step is provided.

In conclusion, the VRM managing system 10 and the synchronization method using the common bus 5 ensure inter-related operability for the VRMs and, therefore, proper operation of the host multi-processor system.

Figure 6:
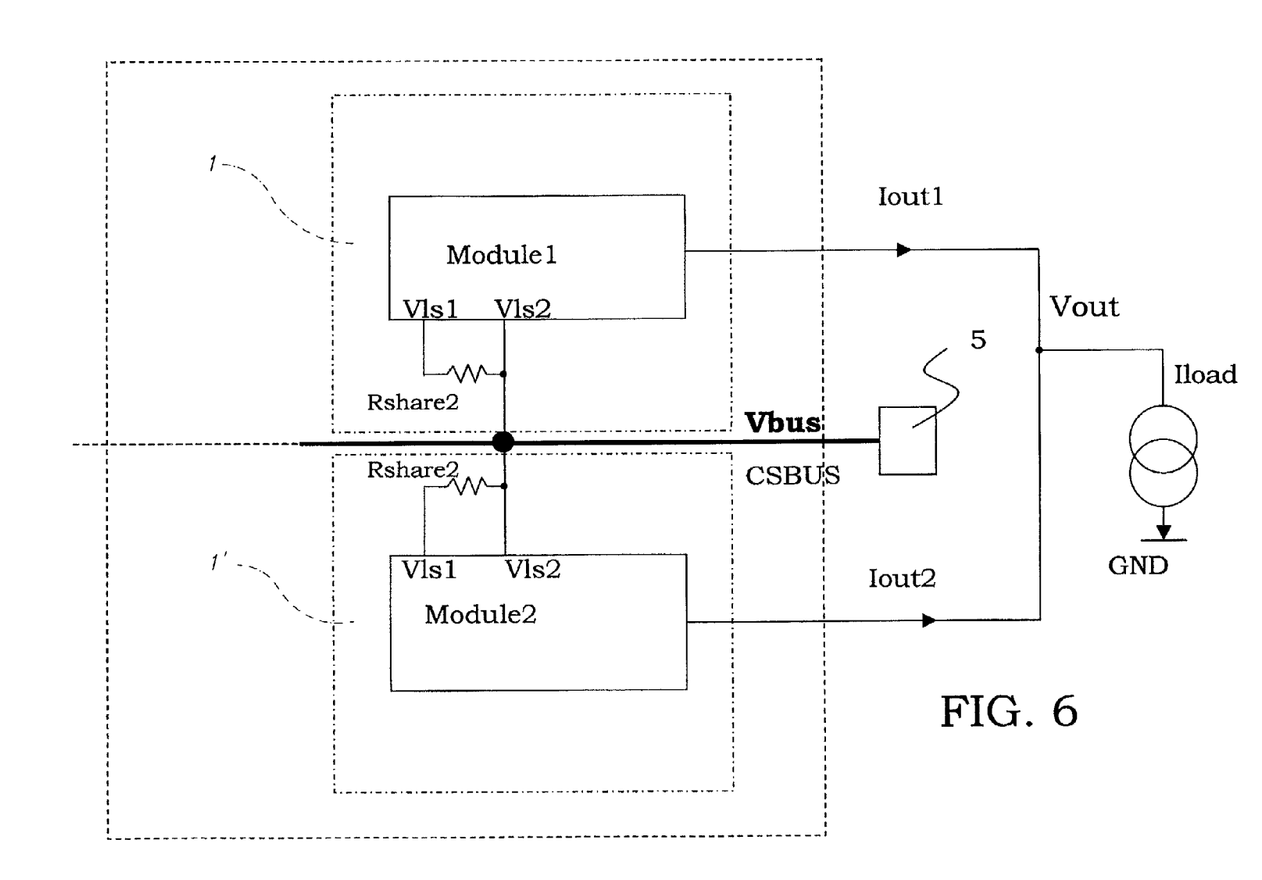
FIG. 6 shows schematically a system that includes plural VRMs according to an embodiment of the invention.

Shown schematically in FIG. 6 is a system that includes plural VRMs 1, 1' coupled together to drive a load with a current Iload according to an embodiment of the invention. The VRMs 1, 1' are also connected to the line CSBUS of the common bus 5 such that each VRM receives the voltage Vbus as the second local control voltage Vls2.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims and the equivalents thereof.

We claim:

1. A managing system for managing a plurality of VRMs associated with a plurality of microprocessors and connected in parallel together between first and second supply voltage references, said VRMs having output terminals connected together and arranged to communicate over a common bus receiving an output current signal from said plurality of VRMs, wherein said managing system comprises:

an equivalent droop resistor;

an error amplifier receiving input signals, said input signals including an output voltage signal from said plurality of VRMs, a reference voltage (Vref), and a droop voltage produced through the equivalent droop resistor, said error amplifier effecting a comparison of said input signals to generate a control voltage signal to said plurality of VRMs;

first and second control resistors connected, in series with each other, to said common bus to receive said output current signal;

a third summing node, being input a first local control voltage from said first control resistor as a positive addend and a second local control voltage from said second control resistor as a negative addend; and a controller connected to an output of said third summing node and said equivalent droop resistor for supplying an internal control current to said equivalent droop resistor.

2. A managing system according to claim 1, comprising:

at least a first summing node, being connected to said error amplifier and said equivalent droop resistor, said first summing node receiving the reference voltage as a positive addend and receiving, as negative addends, the droop voltage and a total voltage resulting from a summation, performed in a second summing node, of the output voltage signal from said plurality of VRMs and said second supply voltage reference.

3. A managing system according to claim 2, wherein said error amplifier comprises an operational amplifier having a first input terminal to receive said reference voltage and an output terminal feedback-connected, through a capacitor, to a second input terminal thereof, said second input terminal being connected to an internal circuit node, said internal circuit node receiving the sum of a droop current (Idroop), the internal control current, and said output voltage signal from the VRM plurality through a feedback resistor (Rfb) passing said sum of currents.

4. A managing system according to claim 3, further comprising a compensation resistor (Rc) connected to said internal circuit node; and an amplifier that supplies to the compensation resistor a sum of said control voltage and said reference voltage.

5. A managing system according to claim 4, wherein a regulated voltage signal is output being equal to:

Vref−Idroop*Rfb−Vshare*Rfb/Rc, said droop current being proportional to the value of said output current signal from the VRM plurality, and said control voltage (Vshare) being proportional to the ratio Iload/N-Iout, where N is the number of cascaded modules in said VRM plurality.

6. A control system for controlling a first voltage reference module that outputs an output voltage, comprising:

a first error amplifier having a first input and an output, the first input being coupled to the output;

a first current generator coupled to the first input of the first error amplifier;

a controller having a second current generator coupled to the first input of the first error amplifier, the second current generator being responsive to a voltage on a common bus connected between the first voltage reference module and a second voltage reference module;

a second error amplifier having a first input coupled to the common bus, a second input coupled to the first input of the first error amplifier, and an output coupled to the second current generator;

a share resistor coupled between the common bus and the second input of the second error amplifier;

a first resistor connected between the share resistor and the first input of the second error amplifier; and a second resistor connected between the share resistor and the second input of the second error amplifier, the first resistor, share resistor, and second resistor being connected in series with each other.

7. A control system according to claim 6 wherein the first error amplifier further comprises a second input coupled to a voltage reference.

8. A control system according to claim 6 wherein the output and first input of the first error amplifier are feedback-connected to one another.

9. A control system for controlling a first voltage reference module that outputs an output voltage, comprising:

a first error amplifier having first and second inputs and an output;

a feedback resistor coupled between the output voltage and the first input of the first error amplifier;

a second error amplifier having a first input coupled to a common bus, a second input coupled to one of the inputs of the first error amplifier, and an output coupled to the first input of the first error amplifier, the common bus being connected to the first voltage reference module and a second voltage reference module;

a share resistor coupled between the common bus and the second input of the second error amplifier;

a first resistor connected between the share resistor and the first input of the second error amplifier; and a second resistor connected between the share resistor and the second input of the second error amplifier, the first resistor, share resistor, and second resistor being connected in series with each other.

10. A control system according to claim 9, further comprising a first current generator coupled between the output of the second error amplifier and the first input of the first error amplifier.

11. A control system according to claim 10, further comprising a second current generator coupled to the first input of the first error amplifier.

12. A control system according to claim 9 wherein the first error amplifier further comprises a second input coupled to a voltage reference.

\* \* \* \* \*